United States Patent
Wilfert et al.

(10) Patent No.: US 6,957,801 B2
(45) Date of Patent: Oct. 25, 2005

(54) VALVE HAVING AN INTEGRATED ACTUATOR ASSEMBLY

(75) Inventors: Russell D. Wilfert, Chandler, AZ (US); Vernon F. Duckett, Tempe, AZ (US); Chuck W. Plevich, Casa Grande, AZ (US)

(73) Assignee: Honeywell International, Inc., Morristown, NJ (US)

( * ) Notice: Subject to any disclaimer, the term of this patent is extended or adjusted under 35 U.S.C. 154(b) by 15 days.

(21) Appl. No.: 10/677,475

(22) Filed: Sep. 30, 2003

(65) Prior Publication Data

US 2005/0067593 A1 Mar. 31, 2005

(51) Int. Cl.⁷ .............................................. F16K 31/02
(52) U.S. Cl. ............................ 251/129.04; 251/129.11; 251/129.13; 137/554
(58) Field of Search ...................... 251/129.01, 129.04, 251/129.05, 129.08, 129.11, 129.13; 137/554

(56) References Cited

U.S. PATENT DOCUMENTS

| | | | |
|---|---|---|---|
| 3,602,254 A | 8/1971 | Fawkes | |
| 4,013,911 A | 3/1977 | Fujiwara et al. | |
| 4,216,795 A | 8/1980 | Cobb et al. | |
| 4,392,375 A | 7/1983 | Eguchi et al. | |
| 4,690,168 A | 9/1987 | Kihm | |
| 4,808,898 A | 2/1989 | Pearson | |
| 4,809,742 A | 3/1989 | Grau | |
| 4,825,904 A | 5/1989 | Grau et al. | |
| 4,957,274 A | 9/1990 | Hood et al. | |
| 5,027,853 A | 7/1991 | Walko et al. | |
| 5,146,126 A | 9/1992 | Hutchins | |
| 5,787,915 A | 8/1998 | Byers et al. | |
| 6,166,374 A | 12/2000 | Snyder | |
| 6,178,956 B1 | 1/2001 | Steinmann et al. | |
| 6,371,440 B1 | 4/2002 | Genga et al. | |
| 6,543,066 B2 | 4/2003 | Tomita et al. | |
| 2002/0089324 A1 | 7/2002 | Miyata et al. | |

Primary Examiner—Justine R. Yu
Assistant Examiner—Peter deVore
(74) Attorney, Agent, or Firm—Ingrassia Fisher & Lorenz

(57) ABSTRACT

A valve assembly includes a fully-integrated actuator assembly. The actuator assembly includes, within a single housing assembly, a torque source, a position sensor, a gear train, and an output shaft. The torque source is adapted to receive one or more position control signals and, in response, to supplies a drive force. The position sensor is coupled to receive the drive force and, in response, supplies a signal representative of valve position. The output shaft is coupled to receive the drive force from the torque source, and thereby selectively moves the valve, upon receipt of the drive force, between the open and closed positions.

26 Claims, 5 Drawing Sheets

VALVE HAVING AN INTEGRATED ACTUATOR ASSEMBLY

STATEMENT REGARDING FEDERALLY SPONSORED RESEARCH OR DEVELOPMENT

This invention was made with Government support under contract number N00019-02-C-3002, awarded by the U.S. Navy. The Government has certain rights in this invention.

FIELD OF THE INVENTION

The present invention relates to valve actuators and, more particularly, to a valve actuator that integrates at least a motor, a position sensor, and an output shaft into a single actuator housing.

BACKGROUND OF THE INVENTION

Valves are used in myriad systems to control the flow of fluid to and from one or more systems or components. In many systems, these valves are operated using some sort of remotely controlled valve actuator assembly. Such actuator assemblies include a torque source that is used to move the valve between its open and closed positions. The torque source may be, for example, a hydraulic actuator, a pneumatic actuator, or an electrical actuator, such as solenoids, and motors.

Many valve actuator assemblies are an agglomeration of several components and/or subassemblies that are interconnected and incorporated into the final valve assembly. Although these valve actuator assemblies are safe and reliable, each presents certain drawbacks. For example, a valve actuator assembly constructed of numerous individual components and/or subassemblies may increase overall weight, size, and cost of the valve to which the actuator assembly is coupled. In addition, the relatively large number of parts may, among other things, adversely impact the overall reliability and performance of the valve actuator assembly.

One of the several individual components and/or subassemblies that make up the above-described actuator assemblies is a position sensor, which is used to supply a signal representative of the position of the valve. In many instances, the position sensors that are used are contamination sensitive and/or cannot be exposed to system fluids without incurring damage. Hence, to protect the position sensor from contamination and/or exposure to system fluids, dynamic seals are employed. Although dynamic seals are reliable in inhibiting contamination and fluids from reaching the position sensor, the seals can also create significant frictional torque. As a result, the operating torque margin for the actuator assembly torque source may be reduced, which may result in the need for a larger torque source, which may in turn increase valve weight and cost.

Hence, there is a need for a valve actuator assembly that is not constructed of numerous individual components and/or subsystems, and/or does not use dynamic seals or other potential sources of frictional torque, and/or reduces valve and valve actuator assembly weight, and/or reduces valve and valve actuator assembly cost, and/or improves valve and valve actuator reliability as compared to present valve and valve actuator assemblies. The present invention addresses one or more of these needs.

SUMMARY OF THE INVENTION

The present invention provides valve assembly that includes a fully-integrated actuator assembly. The actuator assembly includes, within a single housing assembly, a torque source, a position sensor, a gear train, and an output shaft.

In one embodiment, and by way of example only, a valve assembly includes a valve body, a valve element, and an actuator assembly. The valve body has at least a fluid inlet, and a fluid outlet. The valve element is disposed at least partially within the valve body and is moveable between an open position, in which the valve body fluid inlet is in fluid communication with the valve body fluid outlet, and a closed position, in which the valve body fluid inlet is not in fluid communication with the valve body fluid outlet. The actuator assembly is coupled to the valve element and includes a housing, a torque source, a position sensor, and an output shaft. The torque source is disposed within the housing, and is adapted to receive one or more position control signals and is operable, in response thereto, to supply a drive force. The position sensor is disposed within the housing, and is coupled to receive the drive force and is operable, in response thereto, to supply a signal representative of valve position. The output shaft is disposed at least partially within the housing and is coupled to the valve element, the output shaft is further coupled to receive the drive force from the torque source, to thereby selectively move the valve element, upon receipt of the drive force, between the open and closed positions.

In another exemplary embodiment, a valve actuator assembly that is configured to move a valve between an open and closed position includes an actuator housing, a torque source, a position sensor, and an output shaft. The torque source is disposed within the actuator housing, and is adapted to receive one or more position control signals and is operable, in response thereto, to supply a drive force. The position sensor is disposed within the actuator housing, and is coupled to receive the drive force and is operable, in response thereto, to supply a signal representative of valve position. The output shaft is disposed at least partially within the actuator housing and is coupled to the valve element, the output shaft is further coupled to receive the drive force from the torque source, to thereby selectively move the valve, upon receipt of the drive force, between the open and closed positions.

Other independent features and advantages of the preferred valve and actuator assemblies will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific type of valve assembly. Thus, although the present embodiment is, for convenience of explanation, depicted and described as being implemented in a plug valve assembly, it will be appreciated that it can be implemented in various other types of valve assemblies.

Figure 1:
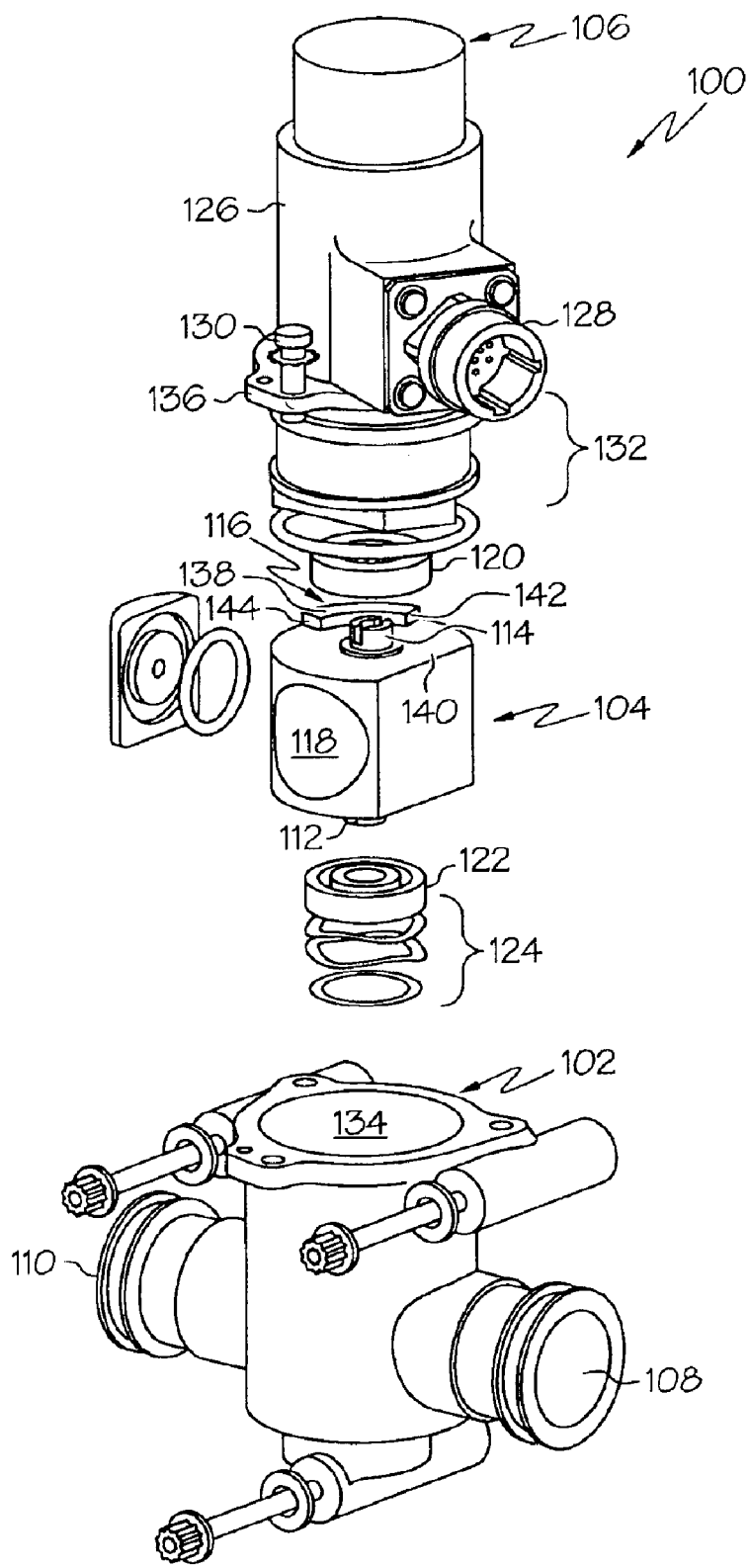
FIG. 1 is a perspective exploded view of a valve assembly according to an exemplary embodiment of the present invention.
Figure 2:
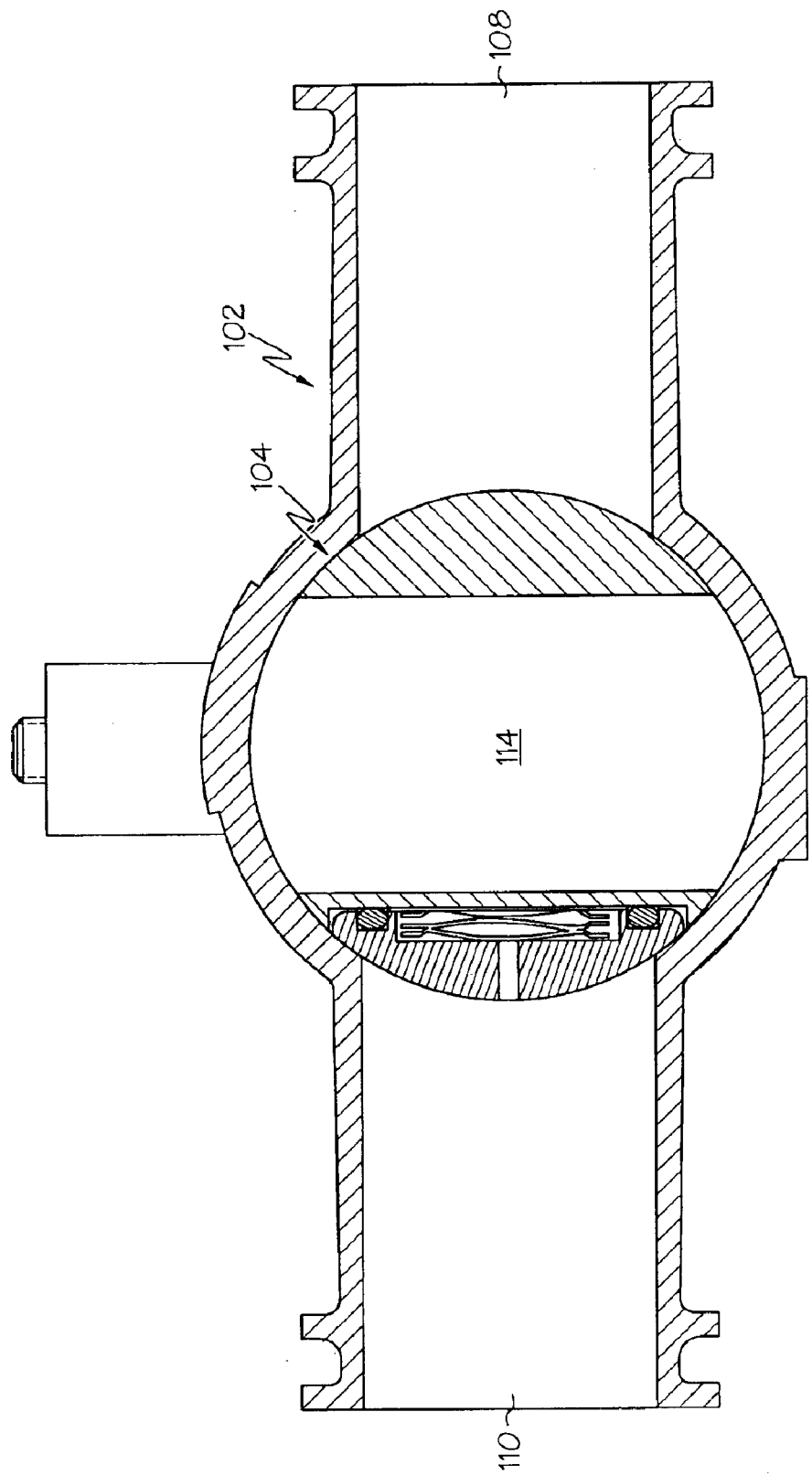
FIGS. 2 and 3 are cross section views of the assembled valve assembly shown in FIG. 1.
Figure 3:
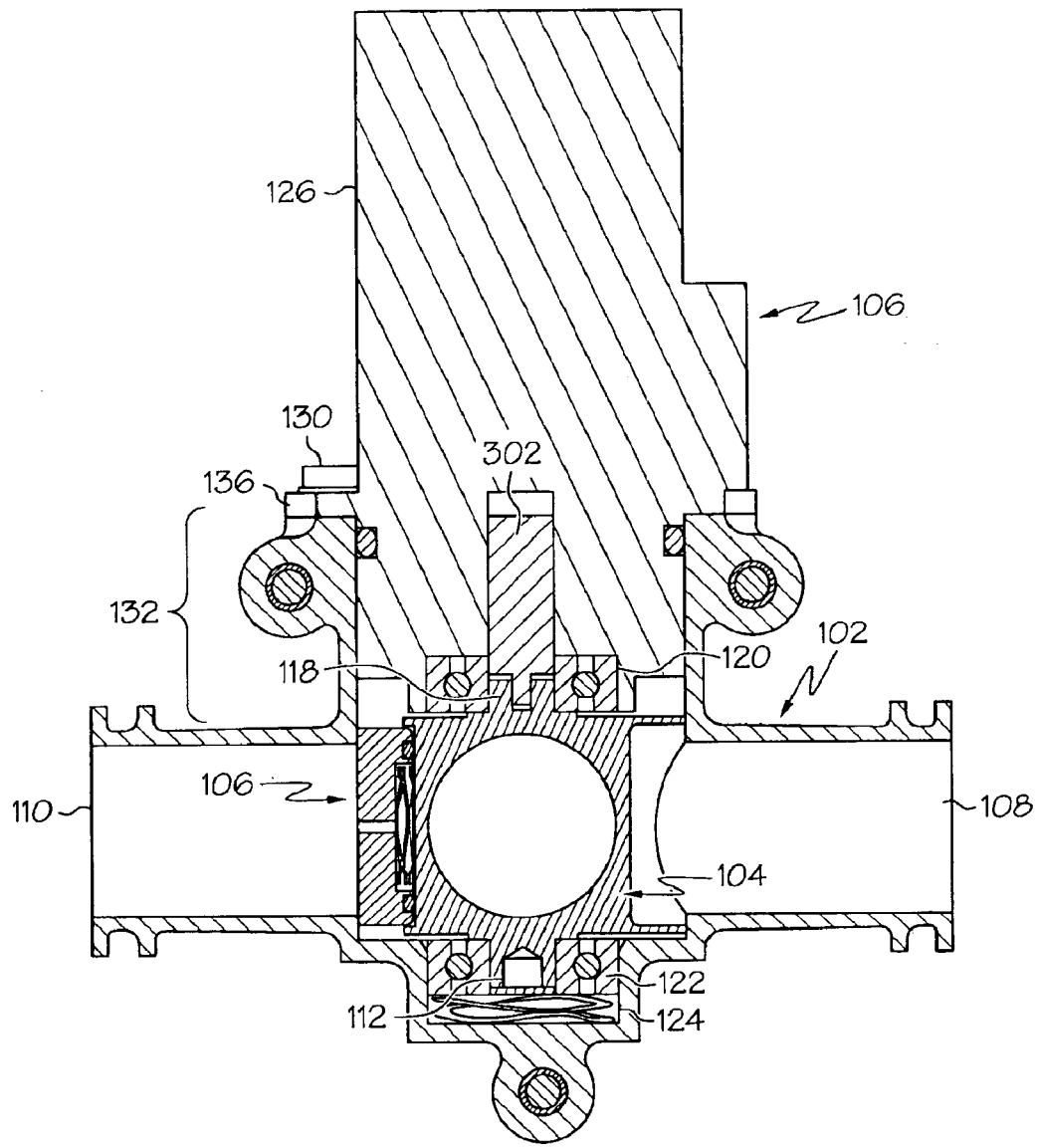

An exemplary embodiment of a valve assembly 100 is illustrated in perspective view in FIG. 1, and in two different cross section views in FIGS. 2 and 3, and is shown to include a valve body 102, a valve element 104, and an actuator assembly 106. The valve body 102 includes a fluid inlet 108, and a fluid outlet 110. The valve element 104 is mounted within the valve body 102 between the fluid inlet 108 and fluid outlet 110. In the depicted embodiment, the valve element 104 is a plug valve that is substantially cylindrical in cross section, and includes a lower shaft 112, an upper shaft 114, an engagement structure 116, and a flow passage 118 that extends through the valve element 104. The upper shaft 114 is used to interface the valve element 104 to the actuator assembly 106. As such, it is also referred to herein as the interface shaft 114. Moreover, as was alluded to above, it will be appreciated that a plug valve is merely exemplary of one of the numerous types of valve elements that could be used.

No matter the particular type of valve element 104 used, it is seen that the valve element 104 is rotationally mounted within the valve body 102, and is moveable between a closed position and an open position. In the depicted embodiment, as shown most clearly in FIGS. 2 and 3, when the valve element 104 is in the closed position, the flow passage 118 is not in fluid communication with the valve body fluid inlet 108 and outlet 110. Thus, fluid flow through the valve assembly 100 is inhibited. Conversely, when the valve element 104 is moved to the open position, the flow passage 118 is in fluid communication with the valve body fluid inlet 108 and the valve body fluid outlet 10. Thus, fluid may flow through the valve assembly 100.

The valve element 104 may be rotationally mounted in the valve body 102 using any one of numerous types of hardware and hardware configurations. In the depicted embodiment, however, the valve element 104 is rotationally mounted using two bearing assemblies, an upper bearing assembly 120, and a lower bearing assembly 122. The upper bearing assembly surrounds the interface shaft 114, and the lower bearing assembly 122 surrounds the lower shaft 112. A spring 124 is preferably disposed between the valve body 102 and the lower bearing assembly 122. The spring 124 supplies an upward bias to inhibit axial movement of the valve element 104 and to load the upper 120 and lower 122 bearing assemblies. It will be appreciated that the valve assembly 100 could be implemented without the spring 124.

The valve actuator assembly 106 is mounted to the valve body 102, and is coupled to the valve element 104. The valve actuator assembly 106 includes a housing 126, a receptacle assembly 128, and a non-illustrated actuator. The actuator assembly housing 126 is mounted on the valve body 102, and is coupled thereto via, for example, one or more threaded fasteners 130 (only one shown). Referring to FIGS. 1 and 3 in combination, it is seen that a portion of the actuator assembly housing 126, referred to herein as the interface section 132, extends into an opening 134 formed in the valve body 102. A flange 136, which extends substantially perpendicular from the actuator housing 126, seats against a peripheral surface of the opening 134. It is through the flange 136 that the fasteners 130 extend.

The receptacle assembly 128 is coupled to the actuator assembly housing 126 and is adapted to receive valve command signals, and couple these signals to the non-illustrated actuator disposed within the actuator assembly housing 126. In response to the valve commands signals, the actuator assembly 106 selectively moves the valve element 104 between the open and closed positions. To do so, the actuator assembly 106 is coupled to the valve element 104 via an output shaft 302, which is shown most clearly in FIG. 3. In particular, the actuator assembly output shaft 302, as was alluded to above, engages the interface shaft 114 on the valve element 104. Thus, as the actuator assembly output shaft 302 rotates, the valve element 104 will correspondingly rotate. As FIG. 3 also shows, the actuator assembly output shaft 302 and the interface shaft 114 share the upper bearing assembly 120.

Figure 4:
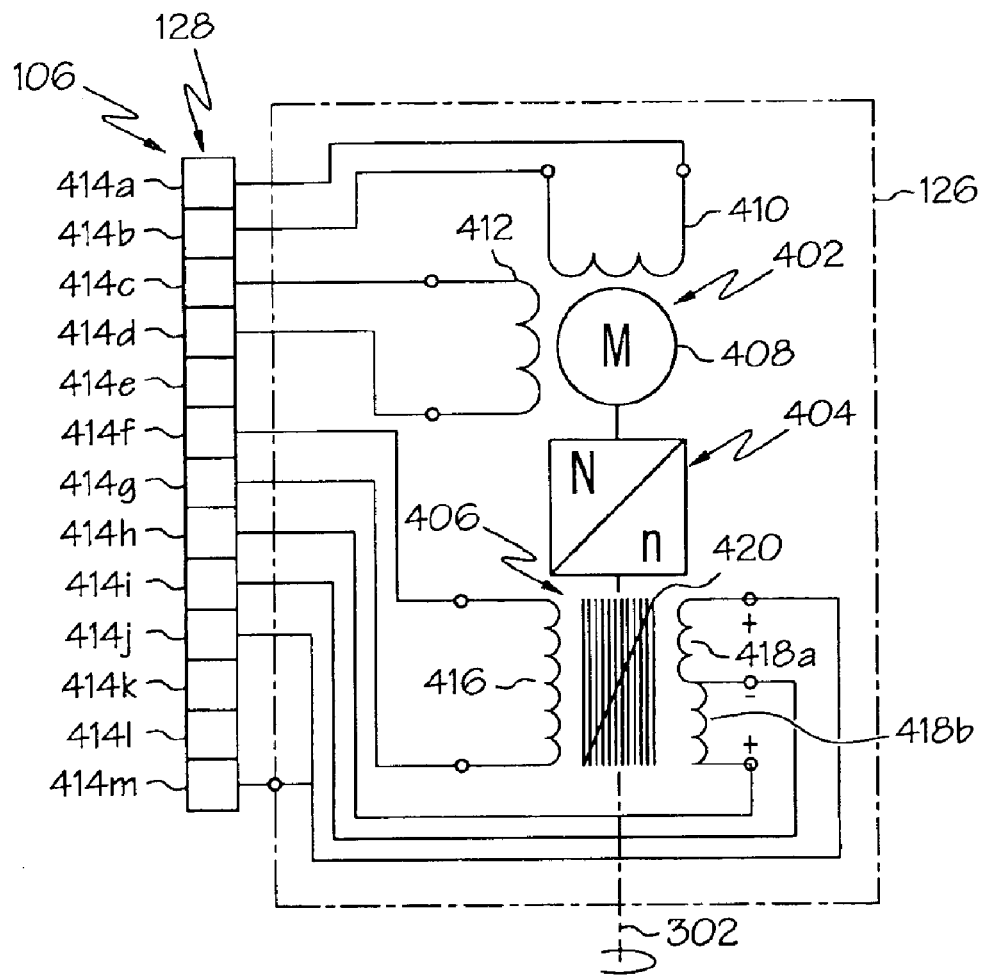
FIG. 4 is a schematic diagram of an valve actuator assembly according to an exemplary embodiment that may be used in the valve assembly of FIGS. 1–3.

Turning now to FIG. 4, which shows the actuator assembly 106 in a simplified schematic form, a more detailed description of the actuator assembly 106 will be provided. The actuator assembly 106 includes, within the actuator assembly housing 126, a torque source 402, a gear train 404, a position sensor 406, and the output shaft 302. The torque source 402 may be any one of numerous devices that generate a torque in response to one or more command signals. In the depicted embodiment, the torque source 402 is a stepper motor. The stepper motor 402, as is generally known, includes a rotor 408 and at least two sets of stator windings 410, 412. These stator windings are electrically coupled to selected pins 414a–414d in the receptacle 128. The stepper motor rotor 408 will rotate in either a clockwise or a counterclockwise direction depending on the phase sequence of the command signals supplied to the stator windings 410, 412, and thereby supply a drive force to the other components within the housing 126.

The gear train 404 is coupled to receive the drive force supplied by the stepper motor 402 and transfer it to the other components within the housing 126. The gear train 404 may be configured as any one of numerous gear trains, but in a particular preferred embodiment is configured as a step-down (N:n) gear train. A step-down gear train 404 is preferred since the stepper motor 402 operates more efficiently at high rotational speeds, whereas the other components that receive the drive force transferred via the gear train 404 operate more efficiently and/or effectively at lower rotational speeds.

The position sensor 406, which may be any one of numerous types of known position sensors, is preferably configured to receive the drive force supplied from the torque source 402 and transferred via the gear train 404. In the depicted embodiment, the position sensor 406 is an RVDT (rotary variable differential transformer), that includes a primary winding 416, two secondary windings 418a, 418b, and a rotary core 420. The primary 416 and secondary 418a, 418b windings are electrically coupled to selected pins 414f–414j. When the actuator assembly 106 is coupled to a control circuit (not shown) or other control signal source, the primary winding 416 is adapted to receive a substantially fixed-frequency AC signal. The secondary windings 418a, 418b, which are magnetically coupled to the primary winding 416 via the rotary core 420, are electrically coupled in series with one another, but in opposite phase. As a result, the voltage magnitudes across each of the secondary windings 418a, 418b are subtracted from one another. The magnitude of the voltage difference varies with the rotational position of the rotary core 420. In particular, as the rotary core 420 rotates, the magnetic coupling between the primary winding 416 and one of the secondary windings 418a (418b) increases while the magnetic coupling between the primary winding 416 and the other secondary winding 418*b* (418*a*) decreases, to thereby provide an indication of rotational position of the rotary core 420, and thus the valve element 104. The RVDT position sensor 406 is not only accurate, but its operation is unaffected if it is wetted with fluid or exposed to contamination. As a result, a dynamic seal is not provided on the actuator assembly 106, which significantly reduces frictional forces in the actuator assembly 106.

The output shaft 302 is coupled to receive the drive force supplied by the torque source 402. In the depicted embodiment, the output shaft 302 is coupled to receive the motor drive force via the gear train 404 and the position sensor rotary core 420. The output shaft 302, as was previously noted, is also coupled to the valve element interface shaft 114. Thus, as the torque source 402 causes the gear train 404, the position sensor 406, and the output shaft 302 to rotate, the valve element 104 also rotates.

Figure 5:
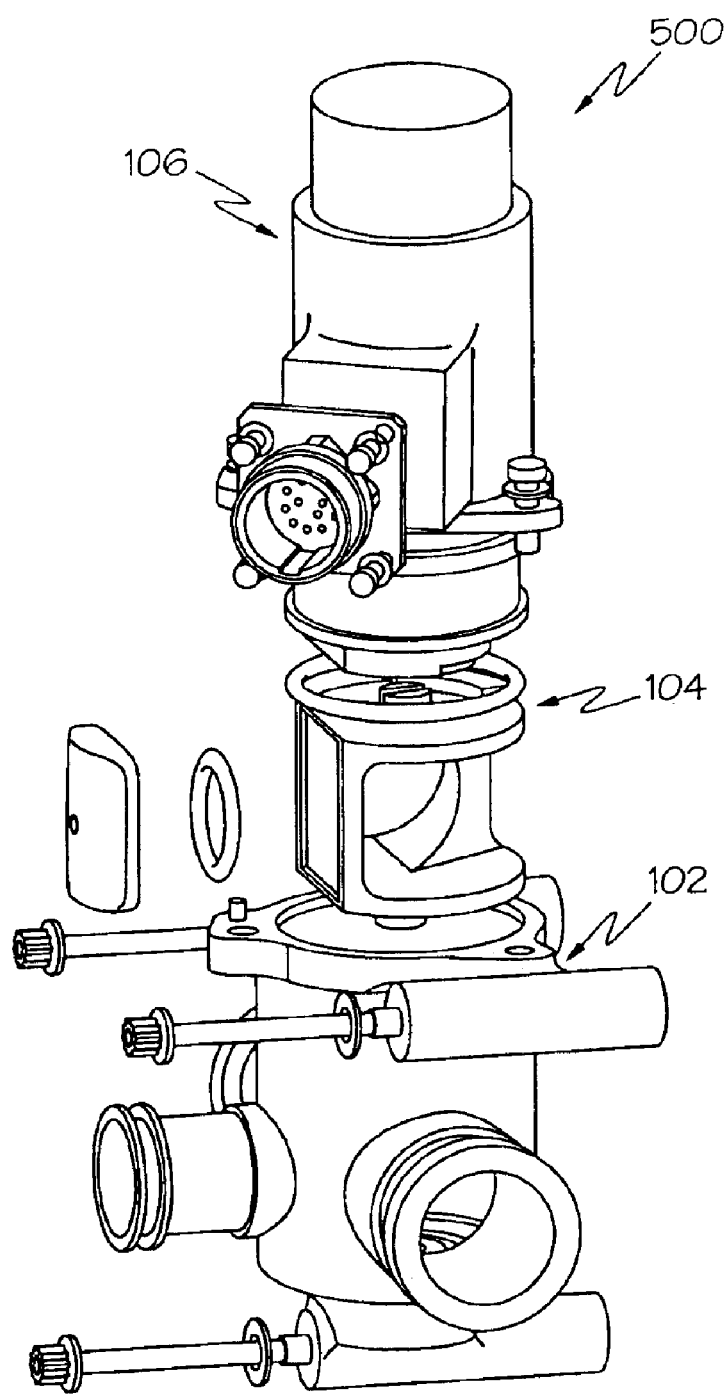
FIG. 5 is a perspective exploded view of a valve assembly according to an exemplary alternative embodiment of the present invention.

The valve assembly 100 depicted in FIGS. 1–4 and described above is implemented as a two port valve. However, it will be appreciated that the valve assembly 100 could be configured with more than this number of ports. For example, an exploded perspective view of a three port valve assembly 500 is illustrated in FIG. 5.

The valve assembly 100 configuration and, more particularly, the actuator assembly 106 configuration described above provide a valve and actuator assembly with fewer parts than present designs, since many parts, such as various seals, rings, and individual component housings, are not used. With fewer parts to assemble, the manufacturing and assembly costs associated with the actuator assembly 106 can be reduced. In addition, the actuator assembly 106 provides improved torsional stiffness, the likelihood of valve backlash is decreased, actuator output torque is improved, and heat rejection from the electrical components in the actuator assembly 106 is improved. These factors also reduce the overall size of the valve assembly 100, lower the valve assembly weight and cost, and improve overall reliability and performance.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A valve assembly, comprising:
    a valve body having at least a fluid inlet, and a fluid outlet;
    a valve element disposed at least partially within the valve body and moveable between (i) an open position, in which the valve body fluid inlet is in fluid communication with the valve body fluid outlet, and (ii) a closed position, in which the valve body fluid inlet is not in fluid communication with the valve body fluid outlet;
    an actuator assembly coupled to the valve element, the actuator assembly including:
        a housing,
        a torque source disposed within the housing, the torque source adapted to receive one or more position control signals and operable, in response thereto, to supply a drive force,
        a position sensor disposed within the housing, the position sensor coupled to receive the drive force and operable, in response thereto, to supply a signal representative of valve position, and
        an output shaft disposed at least partially within the housing and coupled to the valve element, the output shaft further coupled to receive the drive force from the torque source, to thereby selectively move the valve element, upon receipt of the drive force, between the open and closed positions; and
    a gear train disposed within the actuator assembly housing and coupled between the torque source and the position sensor, whereby the drive force from the torque source is coupled to the position sensor.

2. The valve assembly of claim 1, wherein the gear train is a step down gear train.

3. The valve assembly of claim 1, further comprising:
    a connector assembly coupled to the housing and including a plurality of conductors electrically coupled to at least the torque source.

4. The valve assembly of claim 3, wherein the connector assembly further includes a plurality of conductors electrically coupled to at least the position sensor.

5. The valve assembly of claim 1, wherein the torque source comprises an electric motor.

6. The valve assembly of claim 5, wherein the electric motor is a stepper motor.

7. The valve assembly of claim 1, wherein the position sensor comprises a rotary variable differential transformer (RVDT).

8. The valve assembly of claim 1, further comprising:
    a shaft bearing assembly disposed within the actuator housing and surrounding at least a portion of the output shaft.

9. The valve assembly of claim 1, wherein the output shaft is coupled to the position sensor to thereby receive the drive force therefrom.

10. A valve actuator assembly configured to move a valve between an open and closed position, comprising:
    an actuator housing;
    a torque source disposed within the actuator housing, the torque source adapted to receive one or more position control signals and operable, in response thereto, to supply a drive force;
    a position sensor disposed within the actuator housing, the position sensor coupled to receive the drive force and operable, in response thereto, to supply a signal representative of valve position; and
    an output shaft disposed at least partially within the actuator housing and coupled to the position sensor to receive the drive force therefrom, to thereby selectively move the valve, upon receipt of the drive force, between the open and closed positions.

11. The actuator assembly of claim 10, further comprising:
    a gear train disposed within the actuator assembly housing and coupled between the torque source and the position sensor, whereby the drive force from the torque source is coupled to the position sensor.

12. The actuator assembly of claim 11, wherein the gear train is a step down gear train.

13. The actuator assembly of claim 10, further comprising:
    a connector assembly coupled to the housing and including a plurality of conductors electrically coupled to at least the torque source.

14. The actuator assembly of claim 13, wherein the connector assembly further includes a plurality of conductors electrically coupled to at least the position sensor.

15. The actuator assembly of claim 10, wherein the torque source comprises an electric motor.

16. The actuator assembly of claim 15, wherein the electric motor is a stepper motor.

17. The actuator assembly of claim 10, wherein the position sensor comprises a rotary variable differential transformer (RVDT).

18. A valve assembly, comprising:

a valve body having at least a fluid inlet, and a fluid outlet;

a valve element disposed at least partially within the valve body and moveable between (i) an open position, in which the valve body fluid inlet is in fluid communication with the valve body fluid outlet, and (ii) a closed position, in which the valve body fluid inlet is not in fluid communication with the valve body fluid outlet; and an actuator assembly coupled to the valve element, the actuator assembly including:

a housing, a motor disposed within the housing, the motor adapted to receive one or more position control signals and operable, in response thereto, to supply a drive force, a gear train disposed within the actuator assembly housing, the gear train coupled to receive and transfer the drive force supplied from the motor, a position sensor disposed within the housing, the position sensor coupled to receive the drive force transferred from the gear train and operable, in response thereto, to supply a signal representative of valve position, and an output shaft disposed at least partially within the housing and coupled to the valve element, the output shaft further coupled to receive the drive force transferred from the gear train, to thereby selectively move the valve element, upon receipt of the drive fore; between the open and closed positions.

19. A valve assembly, comprising:

a valve body having at least a fluid inlet, and a fluid outlet;

a valve element disposed at least partially within the valve body and moveable between (i) an open position, in which the valve body fluid inlet is in fluid communication with the valve body fluid outlet, and (ii) a closed position, in which the valve body fluid inlet is not in fluid communication with the valve body fluid outlet;

an interface shaft coupled to the valve element;

an actuator assembly coupled to the interface shaft, the actuator assembly including:

a housing, an output shaft disposed at least partially within the housing and coupled to the interface shaft, the output shaft adapted to receive a drive force and configured, in response thereto, to selectively move the valve element between the open and closed positions, and a shaft bearing assembly disposed within the actuator housing and surrounding at least a portion of the output shaft and the interface shaft; a torque source disposed within the actuator assembly housing, a position sensor disposed within the actuator assembly housing; and a gear train disposed within the actuator assembly housing and coupled between the torque source and the position sensor, whereby the drive force from the torque source is coupled to the position sensor.

20. The valve assembly of claim 19, wherein the torque source adapted to receive one or more position control signals and operable, in response thereto, to supply the drive force to the output shaft.

21. The valve assembly of claim 19, wherein the position sensor coupled to receive the drive force and operable, in response thereto, to supply a signal representative of valve position.

22. The valve assembly of claim 21, wherein the gear train is a step down gear train.

23. The valve assembly of claim 20, wherein the torque source comprises an electric motor.

24. The valve assembly of claim 23, wherein the electric motor is a stopper motor.

25. The valve assembly of claim 21, wherein the position sensor comprises a rotary variable differential transformer (RVDT).

26. The valve assembly of claim 21, wherein the output shaft is coupled to the position sensor to thereby receive the drive force therefrom.

* * * * *